United States Patent [19]

Prinoth

[11] 3,936,074
[45] Feb. 3, 1976

[54] VEHICLE CHASSIS

[76] Inventor: Ernesto Prinoth, Corso 33, Ortisei (BZ), Italy

[22] Filed: Apr. 9, 1974

[21] Appl. No.: 459,239

Related U.S. Application Data

[63] Continuation-in-part of Ser. No. 322,604, Dec. 16, 1971, abandoned.

[52] U.S. Cl............................................ 280/106 R
[51] Int. Cl.²........................................ B62D 21/00
[58] Field of Search ................................. 280/106 R

[56] References Cited
UNITED STATES PATENTS
2,063,758  12/1936  Schjolin ......................... 280/106 R
FOREIGN PATENTS OR APPLICATIONS
857,896  12/1952  Germany........................ 280/106 R
417,842  8/1925  Germany........................ 280/106 R

*Primary Examiner*—Philip Goodman
*Attorney, Agent, or Firm*—Otto John Munz

[57] ABSTRACT

A polygonal chassis for a vehicle, having wheels or tracks, particularly intended for travel over rough terrain. The chassis preferably polygonal has peripheral members provided with journals for an inner or an outer train bearing and driving means. The chassis is made of sections joined by articulated flexible couplings in the corners of the perimeter of the frame. A second set of such couplings is provided optionally at the junction of a rigid brace with the frame. A first species of the invention teaches the use of rigid girders as the frame brace, with each girder connected with the outside of the frame by articulate couplings, or the girders are crossing each other and connect to the opposite periphery of the frame by articulate or flexible couplings and in the alternative a rigid bracing of inner longitudinal girders is joined by the same type of couplings to the opposite portions of the frame.

A second species of the invention discloses bracing for the frame in the form of wire ropes with adjustable initial tension. As an improvement on this two diagonals of wire ropes are provided with means to adjust their tension.

A further improvement disclosed is a crossing.

An improvement over the basic disclosure teaches the joining of a plurality of frames, selected among the first and second species thereof, and conventional prior art frames, by the inventive improvements of this invention, either side-by-side or tandem and if more than two frames are to be joined by a tandem arrangement.

6 Claims, 6 Drawing Figures

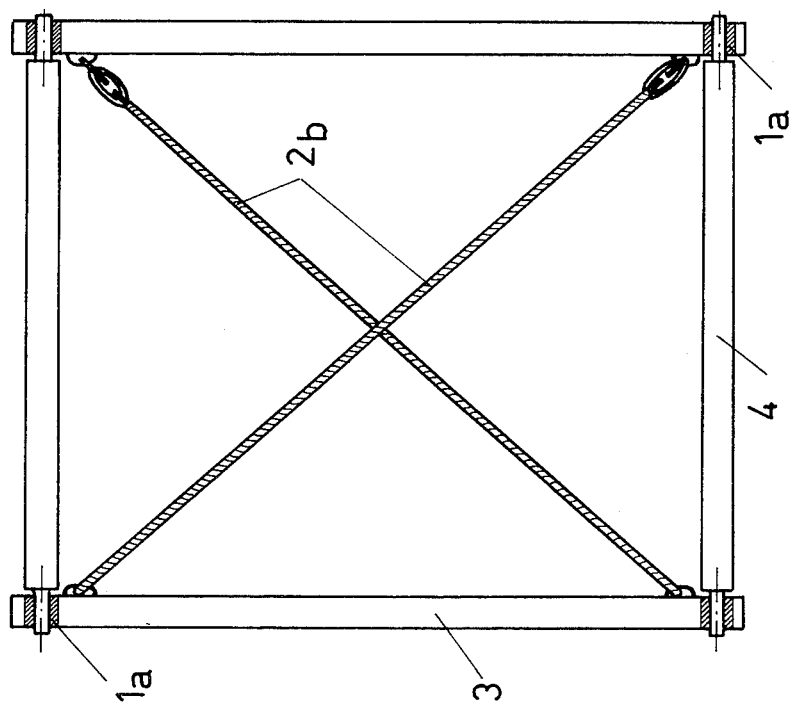
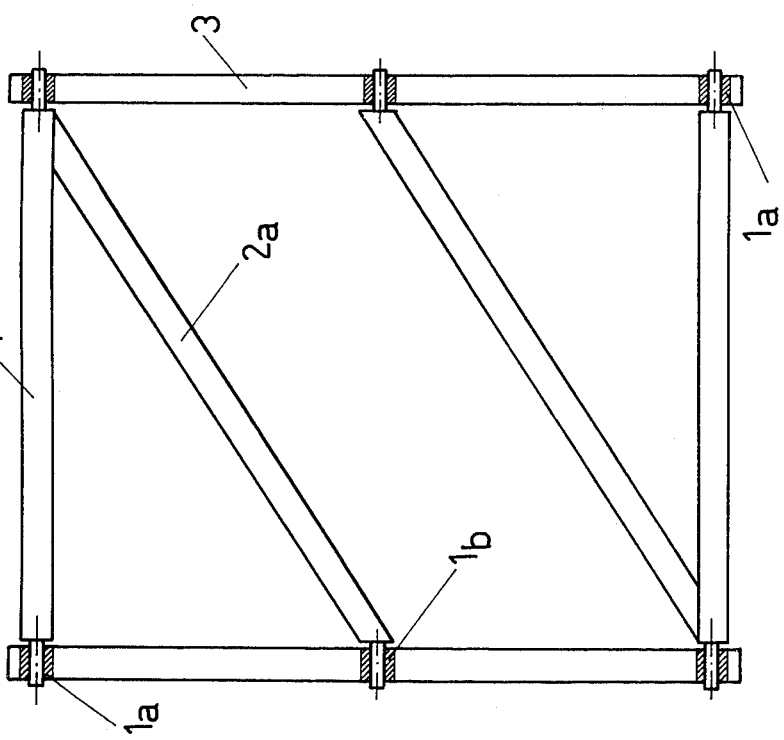

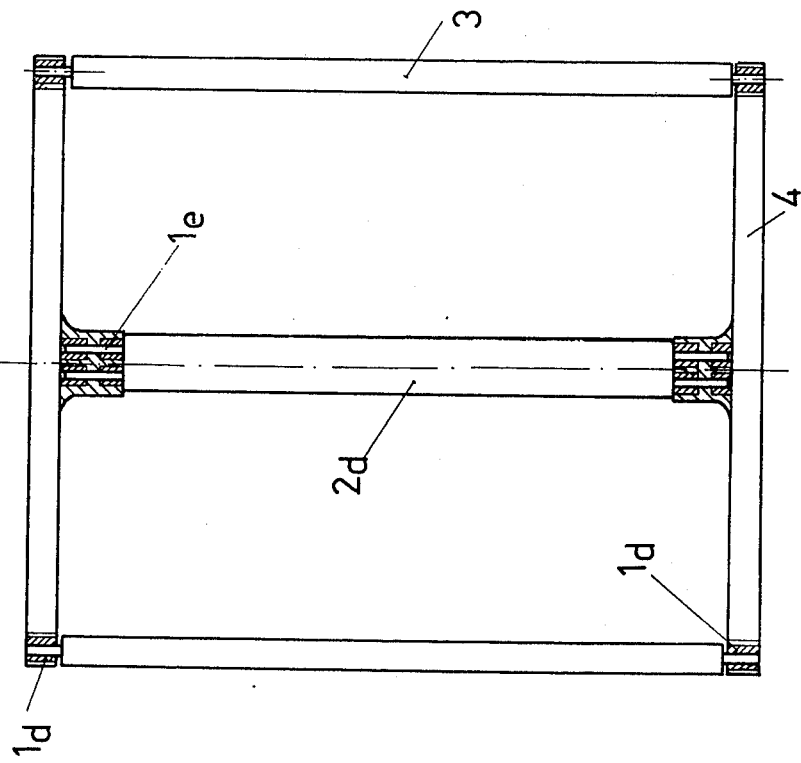
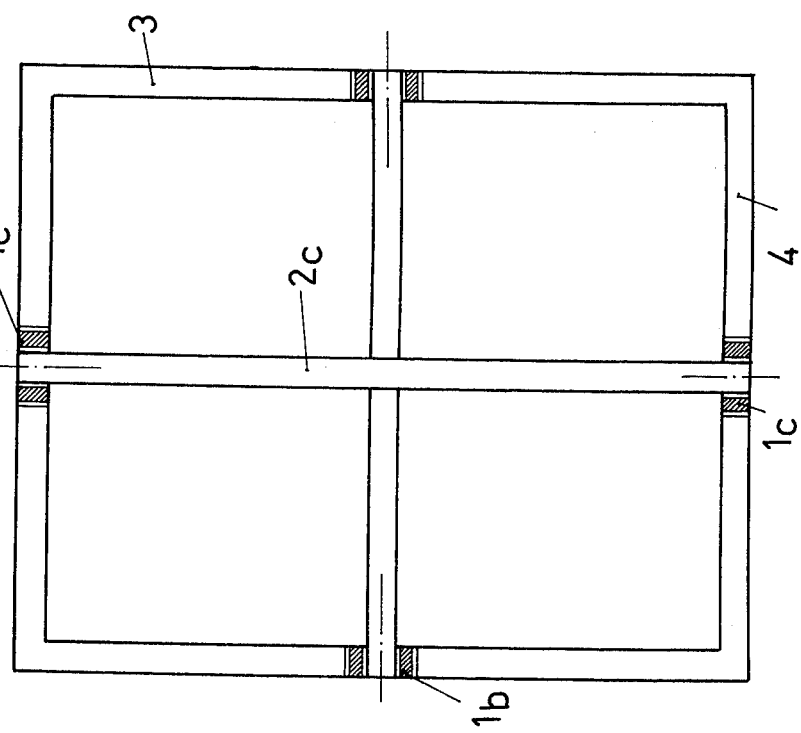

VEHICLE CHASSIS

CROSSREFERENCE TO A RELATED APPLICATION

This is a Continuation-In-Part application to the pending U.S. Pat. application, Ser. No. 322,604, now abandoned, filed on Dec. 16, 1971, of the same inventor.

BACKGROUND OF THE INVENTION

1. Field of the Invention

This invention relates to a chassis member for use with vehicles and has particular, but not exclusive, use with wheel or track vehicles intended for use over uneven or rough terrain. (Class 280. Subclass 106).

2. Description of the Prior Art

It is known that rigid chassis members for wheeled vehicles require independent springs associated with each wheel and preferably independent suspension and shock absorbers. Similarly, on track vehicles each track must have independent springs and possibly independent shock absorbers. Such springs and shock absorbers are usually associated with the front and rear portions of the track although springs and shock absorbers may be disposed intermediate the end portions of the track.

While such prior art devices have maintained the base of the vehicle in a substantially undeformed state, the space required for springs and shock absorbers has been excessive and has reduced ground clearance.

The prior art is represented by U.S. Pat. No. 985,361 to McCauley, dated Feb. 28, 1911, who discloses a frame comprising a plurality of cast sections, rigidly interconnected with bracings in various arrangements.

SUMMARY OF THE INVENTION

The objects of the invention are:
to provide a chassis of the type described, which:
is flexible and suitable for vehicles, used with wheel and track vehicles traversing rough or uneven ground;
reduces the space required for springs and shock absorbers and reduces the ground clearance; and
which by virtue of its relatively free twisting at its couplings, gives utmost adaptability to and contact with the ground of the train of wheels, whilst the whole weight of the chasis is reduced to a minimum. Other objects and many of the attendant advantages of the invention will become apparent to those skilled in the art from the accompanying description and drawings.

BRIEF DESCRIPTION OF THE DRAWINGS

FIG. 1 is a plan view of an embodiment having end frame members integral with diagonally disposed bracing elements.

FIG. 2 is a plan view of an embodiment wherein the frame members are braced by wire ropes.

FIG. 3 is a plan view of an embodiment wherein central longitudinal and central lateral members form rigid bracing elements, and FIG. 4 is a plan view of an embodiment wherein the end members are joined with a central longitudinal rigid member.

Same reference characters denote same or equivalent parts in the several views shown and repetition of indication of parts common to the various views are omitted for purposes of brevity.

DESCRIPTION OF THE PREFERRED EMBODIMENTS

The chassis members per se, of the present invention may constitute the primary springing for the vehicle by utilizing selected ones, of a plurality of frame members, as torsion or flexible elements.

According to the invention, a polygonal chasis, for instance a quadrangular frame, on which may be mounted a power plant and steerage- and control means, and whose peripheral members are provided with journals for an inner or outer train of bearing-and-driving, pneumatic-tired or tracked wheels. The chassis is preferably made of sections, joined by means of articulated or elastic flexible couplings, as for example ball-and-socket joints or elastomeric elements.

According to a first embodiment of the invention, articulated couplings are applied in the corner of the perimeter of the frame.

An improvement on this embodiment provides articulated couplings also at the junction of a rigid bracing member with said frame.

A second embodiment of the invention provides bracing of a frame by rigid girders, whereby each girder connects through an articulate or elastic coupling to an outer side member of the frame, the said girders preferably parallel to each other.

An improvement on the second embodiment of the invention provides rigid bracing for the frame consisting of a cross of girders connecting together on each girder to opposite peripheral members of the frame through articulate or elastic flexible couplings.

Another improvement on the second embodiment of the invention provides rigid bracing consisting of an inner longitudinal, preferably central girder, which joins through articulate or elastic flexible couplings to opposite peripheral members of the frame, preferably two opposite cross members of the frame.

A third embodiment of the invention provides bracing for the frame consisting of wire ropes whose initial tension is adjustable.

In an improvement on the third embodiment of the invention the bracing consists of two diagonals of wire ropes which are each initially preregulated in tension.

Figure 5A:
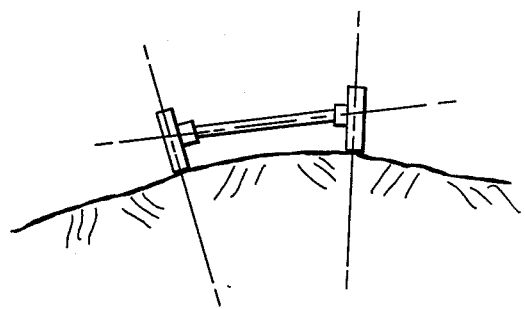
FIGS. 5a and 5b are cross-sectional views of the chassis of the invention depicted in operational engagement with a rough convex and concave terrain, respectively.
Figure 5B:
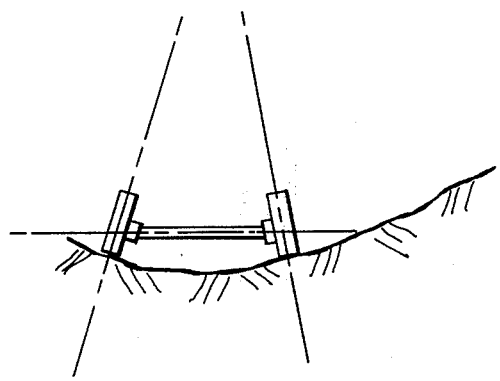

FIGS. 5a and 5b demonstrate the advantages of the invention, showing variations in the tumble of the frame in actual field relationships to a rough convex and concave terrain, respectively.

A last embodiment of the invention provides for joining two or more frames, either conventional or according to the invention either side by side or in tandem, as well as, if more than two frames are to be joined to one another, by side by side and arrangement in tandem.

Referring to FIG. 1, the frame shown comprises a pair of side members 3 which include transverse apertures 1a and 1b.

The apertures may be fitted with elastic torsional couplings formed of rubber or plastic material. The ends of the side members 3 are spanned by end members 4. A pair of diagonal members 2a are rigidly joined at one end thereof to one end of each of an associated end member 4 and the members 2a extend to the opposite side member to engage therein an aperture 1b which is fitted with an elastic torsional coupling.

In FIG. 2, the structure comprises a pair of side members 3 the extremities of the ends thereof being provided with elastic torsional couplings which receive end members 4. Opposed corners of the defined frame are joined by diagonally disposed wire ropes, the tension in each rope being adjusted by means of a turnbuckle. The wire ropes extend between the corners of the defined frame and could also extend if desired, at intermediate points along the opposite side members. Further, in this embodiment the frame defined by members 3 and 4 may be held together by a trellis of stretched wire ropes. The frame according to FIG. 2 may be constructed without bracing, as the couplings at the corners are inwardly stable enough to limit the twist of the articulated chassis.

In FIG. 3, each of the side members 3 and the end members 4 are provided with elastic torsional couplings to receive lateral and longitudinal cross girders 2c. The cross girders 2c, in this embodiment, should be relatively rigid.

In the embodiment shown in FIG. 4 the end members 4 are both provided, at the extremities thereof, with elastic torsional couplings to receive the ends of the side members 3. The end members 4 are further provided with torsional elastic couplings, disposed at the longitudinal centre thereof, to receive a central longitudinal girder 2d.

The chassis according to the invention has the novel advantage that its set of wheels or tracks adapts itself completely to the uneven ground, both lengthwise and with transverse direction to the vehicle. The twist of the articulated chassis permits a limited oscillation of the wheels in both senses. The result is an optimal adhesion to the ground.

In the embodiments thus described the frames are free to yield in response to uneven terrain.

It is to be understood that all the embodiments described show frames that have a rectangular configuration, however, the frame may have any quadrilateral configuration to suit the geometry of the associated vehicle.

It is to be further understood that the elastic torsional couplings may be replaced by ball-and-socket joints to provide the desired articulation. Further, the entire vehicle chassis may comprise a plurality of frames joined together in series, parallel, or series-parallel arrangement. As with single frames the compound frame will conform to uneven terrain without overstressing of individual elements of the frame.

For claim purpose "Couplings" defines elastic couplings, elastic torsional couplings and articulate joints.

What I claim is:

1. A vehicle chassis for a vehicle comprising:
   a frame composed of four rigid frame members, said frame members being one pair of side members and one pair of end members in a rectangular arrangement, and elastic torsional coupling means connecting the adjoining ends of at least two of said frame members for limited swinging movements between them in all directions.

2. A vehicle chassis for a vehicle as claimed in claim 1, further comprising:
   at least one bracing member;
   two of the opposite frame members being interconnected for limited swinging movements in all directions by said bracing member.

3. A vehicle chassis for a vehicle as claimed in claim 2, the said two frame members each being interconnected by coupling means with both ends of said bracing member for limited movements in all directions.

4. A vehicle chassis for a vehicle as claimed in claim 2, said at least one bracing member being interconnected with at least one of its ends by coupling means with two frame members.

5. A vehicle chassis for a vehicle as claimed in claim 4, said at least one bracing member being two bracing members located parallel to each other, each connected with one end to the end of one frame member and with its other end to the adjacent frame member at an intermediate point thereof.

6. A vehicle chassis as claimed in claim 2, said at least one bracing member comprising a pair of diagonally disposed pre-tensioned bracing wires extending between an end of a side member to the opposite end of the opposed side member.

* * * * *